Figure 1:
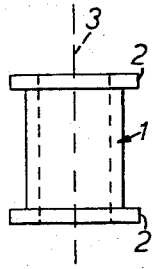

Oct. 18, 1966  G. W. TAYLOR  3,278,995
PATTERN FOR SIMULTANEOUSLY FORMING
AN INTEGRAL MOULD AND CORE
Filed May 13, 1964  2 Sheets-Sheet 1

INVENTOR

GEORGE W. TAYLOR

BY Holcombe, Wetherill + Brisebois
ATTORNEYS

Oct. 18, 1966   G. W. TAYLOR   3,278,995
PATTERN FOR SIMULTANEOUSLY FORMING
AN INTEGRAL MOULD AND CORE
Filed May 13, 1964   2 Sheets-Sheet 2

INVENTOR
GEORGE W. TAYLOR
BY
Holcombe, Wetherill & Brisebois
ATTORNEYS

3,278,995
PATTERN FOR SIMULTANEOUSLY FORMING AN INTEGRAL MOULD AND CORE
George William Taylor, Langston Green, Tunbridge Wells, Kent, England
Filed May 13, 1964, Ser. No. 367,184
Claims priority, application Great Britain, May 14, 1963, 19,176/63
5 Claims. (Cl. 22—9)

The form of many metal castings is such that they cannot be produced solely by making a mould containing an impression of the casting form. One or more cores have to be inserted into the mould for this purpose. A simple example of this is that of a hollow tube in which the outside form of the tube is produced by the mould, but the solid bar that would otherwise be obtained is made tubular by inserting a cylindrical core of appropriate dimensions into the mould. These cores are supported by means of prints, chaplets or a variety of other methods all of which are well known. It has hitherto been common practice to produce the moulds and cores separately, finally inserting the required number of cores into the moulds prior to closing the latter and filling them with molten metal.

Moulds can be made from various materials. Commonly, silica sand is used as a base due to its refractory and other suitable properties, though other materials are used for this purpose. The sand is bonded with a number of agents of which clays, sodium silicate hardened by passing carbon dioxide through the sand binder compact, synthetic resins, furfural aldehyde based resins and silicone esters, are typical examples.

Cores are also produced from similar materials although, generally, due to factors well known in the foundry industry, the sand or other refractory is mixed with various drying oils, synthetic resins, dextrins, starches, silicone esters, furfural aldehyde based resins and sodium silicate hardened with carbon dioxide gas, although clay-bonded sands are also used in many cases.

This invention covers primarily those cases in which moulds and cores for casting metals are or can be made from the same refractory material with the same binder, for example oil-bonded sands with which there may be an admixture of dextrins, starches or other cereal binders, sodium-silicate-bonded sands subsequently hardened by the passage of carbon dioxide gas through the compact, or sand or other refractory granular material admixed or coated with a thermosetting binder used according to the shell moulding process.

According to the present invention a pattern plate for use in the simultaneous production of an integral mould and core has at least one protuberance projecting from one side of the plate and extending over one part of said one side, each said protuberance being of a shape conforming to part of the external surface of an article to be cast, walls on said one part located adjacent the protuberance on both sides thereof, a transverse wall on said one side separating said one part thereof from a second part of said one side, and, in said second part, at least one cavity of a shape conforming to part of the internal surface of the article to be cast, each said cavity extending from a protuberance but being offset with respect thereto.

The apparatus may include several such patterns and core cavities. The apparatus may be in parts which are separable to permit removal of combined mould and core.

A method of casing may include the step of stacking the moulds and cores in a manner such that the core or cores of one integral mould and core fit the mould or moulds of a different integral mould and core. Molten metal runners and pouring funnels can be formed in the combined moulds and cores to receive the molten metal, or funnels can be added separately.

Figure 2:
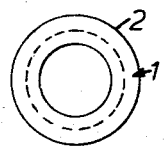
Figure 3:
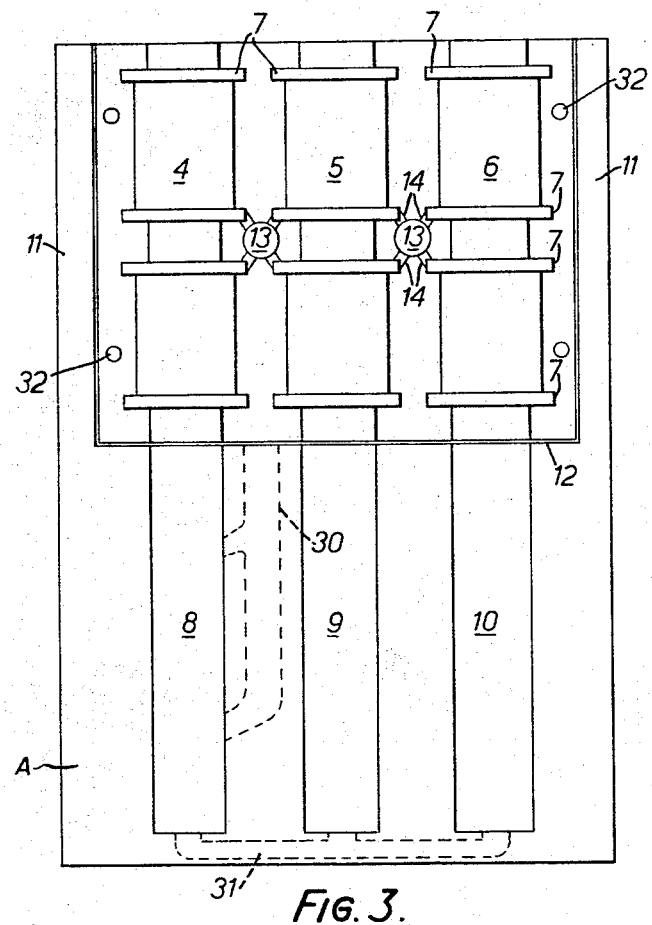
Figure 4:
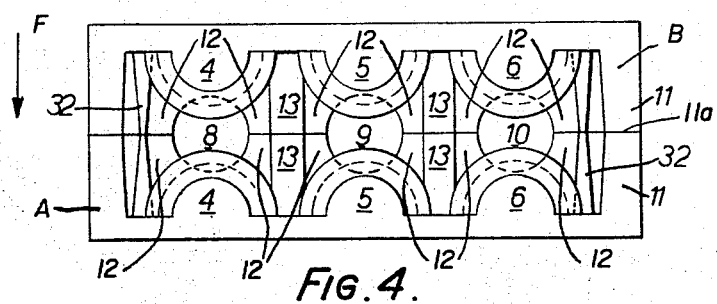
Figure 5:
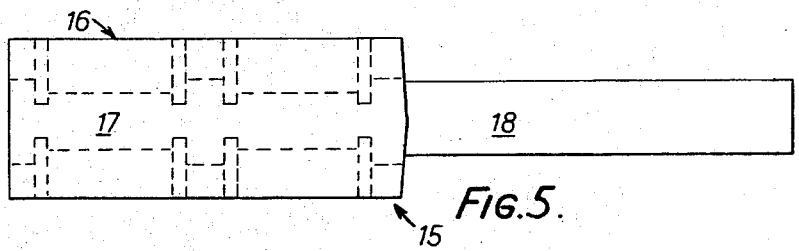
Figure 6:
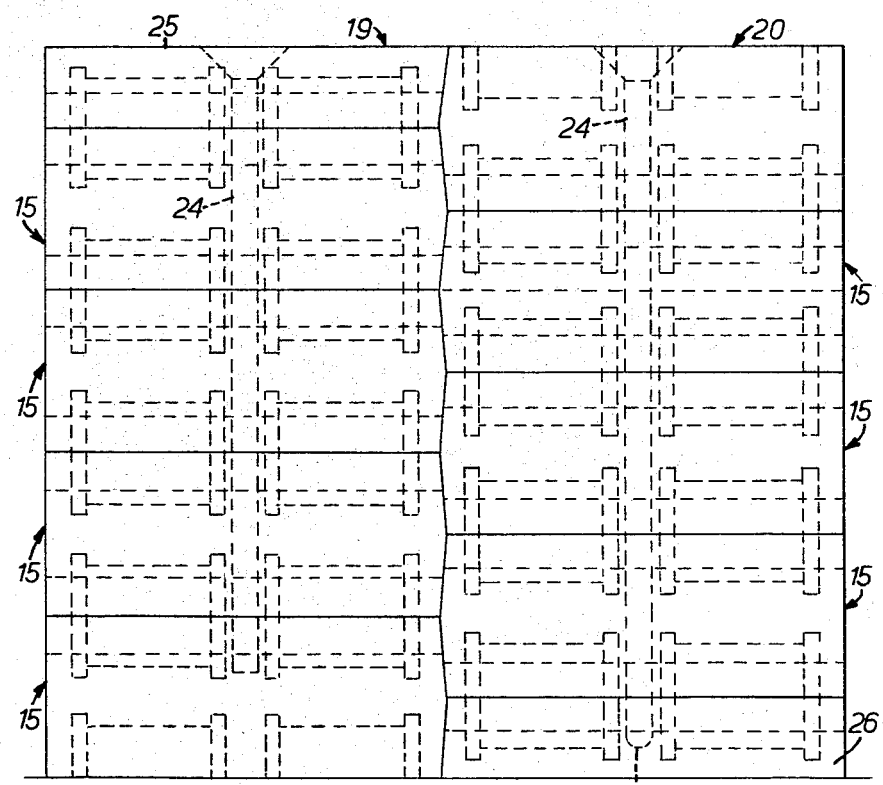
Figure 7:
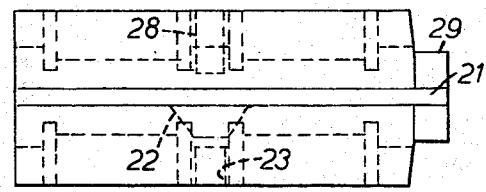

By way of example only, an embodiment of the invention will now be described in greater detail with reference to the accompanying drawings of which:

FIGS. 1 and 2 are respectively an elevation and plan of a cast component,

FIG. 3 is a plan view of one part of a two-part combination pattern and core box, FIG. 4 is an end elevation of an assembled two-part combination pattern and core box, FIG. 5 is a side elevation of a combined core and mould assembly, FIG. 6 is a side elevation of a stack of assembled moulds and cores, ready for pouring, and FIG. 7 is an end elevation of a pattern assembly for producing half-moulds.

Referring first to FIGS. 1 and 2, the component 1 to be cast is of a generally tubular shape having outwardly extending flanges 2 at each end and a longitudinal axis 3.

FIG. 3 which is a view in the direction of arrow F in FIG. 4 shows one part A of a two-part A, B metal pattern and core box of which both parts are seen in mated end elevation in FIG. 4. Both parts comprise an upper portion (as seen in FIG. 3) machined to provide protuberances 4, 5 and 6 of approximately semi-circular form whose surfaces are contoured to correspond with the external configuration of one half of the component 1 assuming the latter to be divided vertically about the axis 3. Thus the protuberances have shoulders 7 which correspond to the flanges 2 of the component 1. The lower portion has a flat surface level with the top of the walls 11, the surface having three channels 8, 9 and 10 of semi-circular transverse cross-section machined in it corresponding to the inner surface of the component to be cast. As can be seen from FIG. 4, the channels 8, 9 and 10 are displaced in position with respect to the protuberances 4, 5 and 6.

The protuberances 4, 5 and 6 are disposed within side walls 11 and a transverse wall 12 so that when the two parts A, B are mated as shown in FIG. 4, there is formed a cavity open at one end but otherwise surrounded by the walls 11 and 12 and into which two sets of protuberances 4, 5 and 6 extend. To provide an improved strength to each mould section, the depth of the wall 11 can be chosen to ensure that the distances between the protuberances 4, 5 and 6 is such that if the mould is made by the shell moulding process a common investment will be formed between the high spots of the opposing protuberances. The channels 8, 9 and 10 of the two parts co-operate to form circular transverse cross-section passages which extend from cavity through the wall 12. Located between adjacent shoulders 7 are pegs 13 which extend from the faces of both parts of the pattern and core box and which are united with adjacent shoulders 7 by short rods 14 as shown.

The parts of the box are mounted back-to-back along junction line 11a, FIG. 4, in a suitable machine which enables them to be brought together into mating engagement in the position shown in FIG. 4 for the insertion of moulding mixture and then to be separated for the removal of the formed mould and core. Ejector pins may be fitted if required but these are not shown in the drawings. Heating means may also be fitted if, for example, the shell mould or hot box process is to be used.

FIG. 5 is a side elevation of a combined mould and core 15 produced after investment. The part 16 of the combined mould and core comprises a hollow mould whose walls 17 result from the investment of the upper and lower surfaces 11 and whose side walls (shown dotted in FIG. 5) are recessed according to the contours of the protuberances 4, 5 and 6. The part 18 of FIG. 5 comprises three cores formed by the channels 8, 9 and 10.

FIG. 6 shows the manner in which the combined moulds and cores are assembled to form a stack by placing the cores and moulds one above the other. The combined moulds and cores are laid in two piles 19 and 20 with the cores of one pile passing into the tubular spaces formed by adjacent but vertically-displaced mating moulds of the other pile.

To complete the stack requires two half-moulds and FIG. 7 shows a pattern for producing such half-moulds. The pattern is of the same general form as that shown in FIG. 3 except that there is inserted between the parts of the pattern a metal plate 21 containing an electric heater if required and carrying pouring cup formers 22 located between adjacent protuberances. The formers have extensions 23 which are located between adjacent shoulders 7 and correspond with the pegs 13 described above. The extensions 23 also have rods (not shown) extending from them to the adjacent shoulders. The plate 21 forms a dividing wall and enables two quite separate half-moulds to be formed. Of those half-moulds that including the riser funnel is used to complete pile 19 and the other half-mould is used at the bottom of pile 20.

It will be seen that the former 22, its extension 23 and the pegs 13 have formed in the moulds a continuous channel indicated by the dotted lines 24. That channel 24 is joined by other channels formed by the rods 14 with the spaces between the moulds and the cores.

The mould half produced by the lower (as viewed in FIG. 7) side of the pattern of FIG. 7 is indicated at 25 in FIG. 6. The upper side of that pattern produces a mould half which is indicated by reference numeral 26. Mould half 26 includes a "blind" channel 27 formed by pegs 28 in the pattern of FIG. 7 to complete and close the pouring channel of the pile 20. The pattern of FIG. 7 also has an extension 29 which permits the formation of a core stop to facilitate the positioning of the mould halves.

The pattern and core box described above can be used in the conventional methods of making moulds and cores, in the shell moulding or hot box process and in processes using carbon dioxide for hardening purposes. If necessary, each core portion of the combined pattern and core box may be formed with extra feeders such as that shown by the dotted lines 30 to facilitate the feed of moulding material into the channels 8, 9 and 10. Further, the core box portion may be additionally channelled as at 31 to permit the formation of an extension of the cores for cross bracing and strenthening the latter. To use the combined pattern and core box, the parts A and B are put together as in FIG. 4 and an appropriate quantity of moulding material is fed by some suitable means, for example by being poured, shot or blown into the cavity between the parts A and B. The process of making the mould and core is then continued according to the particular method being used and after completion of the combined mould and core is removed. The surfaces of the protuberances 4, 5 and 6 produce depressions in opposed surfaces of the finished mould and the co-operating channels 8, 9 and 10 produce hollow cores attached to the moulds but extending from between the depressions as shown in FIG. 5.

A convenient means of assembly can be provided by mounting pegs in the pattern plate, by means of which holes of suitable diameter will be provided in each mould section as indicated at 32, FIGS. 3 and 4. Through these holes clamping bars can be fitted to bolt the whole stack assembly firmly together prior to filling with molten metal.

It will be understood that the method of "stack" casting referred to above is not essential. The method of assembly of the moulds and cores will depend upon the configuration of the article to be produced. For example, the mould parts may be assembled in a horizontal instead of a vertical plane, and they need not necessarily be rectangular in shape. The method may be used for producing a single casting of intricate shape, such as a wheel by assembling together a series of mould parts with integral core parts which form segments of the circular mould.

I claim:

1. A pattern for producing simultaneously an integral mould and core comprising a plate having at least one protuberance projecting from one side of the plate and extending over one part of said one side, each said protuberance being of a shape conforming to part of the external surface of an article to be cast, walls on said one part of said one side located on opposite sides of said at least one protuberance, a transverse wall on said one side of said plate separating said one part of said one side from a second part of said one side, and, in said second part, at least one cavity of a shape conforming to part of the internal surface of the article to be cast, each said cavity extending from a protuberance but being offset with respect thereto, whereby when said plate is mated with a complementary plate and moulding material is introduced between the two plates a core and two half-surfaces of two different moulds are produced.

2. A pattern as claimed in claim 1 and further comprising a plurality of parts which together constitute said plate and said complementary plate, said parts being separate to permit removal of said produced core and mould.

3. A pattern as claimed in claim 1 and further comprising, in said second part, feeders to facilitate the flow of moulding mixture to each cavity.

4. A pattern as claimed in claim 1 and further comprising, in said second part, a plurality of cavities and a cross connection joined to each of said plurality of cavities whereby there is produced between cores produced by said cavities a bracing and strengthening member.

5. A pattern as claimed in claim 1 and further comprising means for forming runners on each core and mould runner for use during the pouring of molten metal.

References Cited by the Examiner

UNITED STATES PATENTS

| | | | |
|---|---|---|---|
| 366,869 | 7/1887 | Parmelle | 22—198 |
| 993,599 | 5/1911 | Hewlett | 22—13 |
| 1,034,334 | 7/1912 | Bammister | 22—198 |

J. SPENCER OVERHOLSER, *Primary Examiner.*

MARCUS U. LYONS, *Examiner.*

E. MAR, *Assistant Examiner.*